May 29, 1962     D. R. DIXON     3,036,407
BUILDING BLOCK ASSEMBLY
Filed Nov. 12, 1957
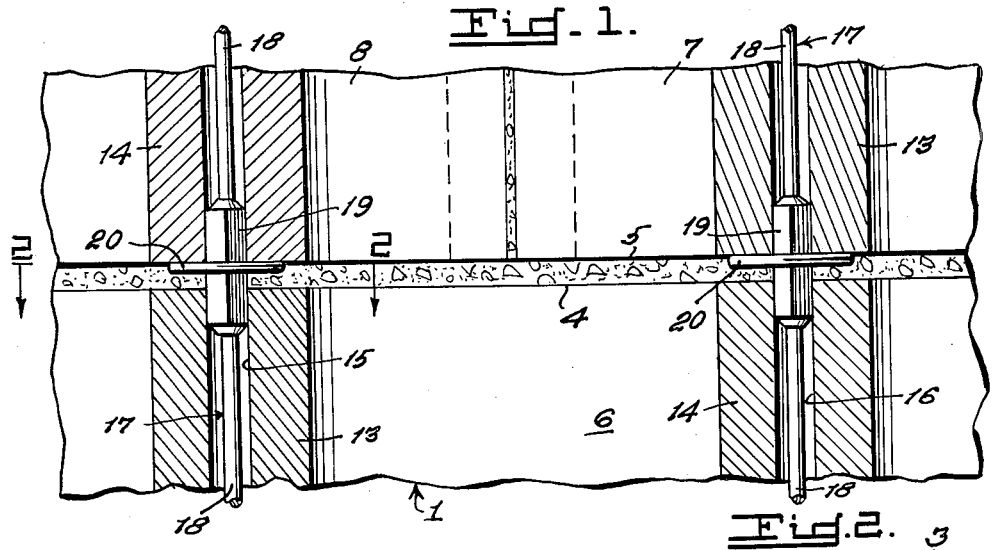
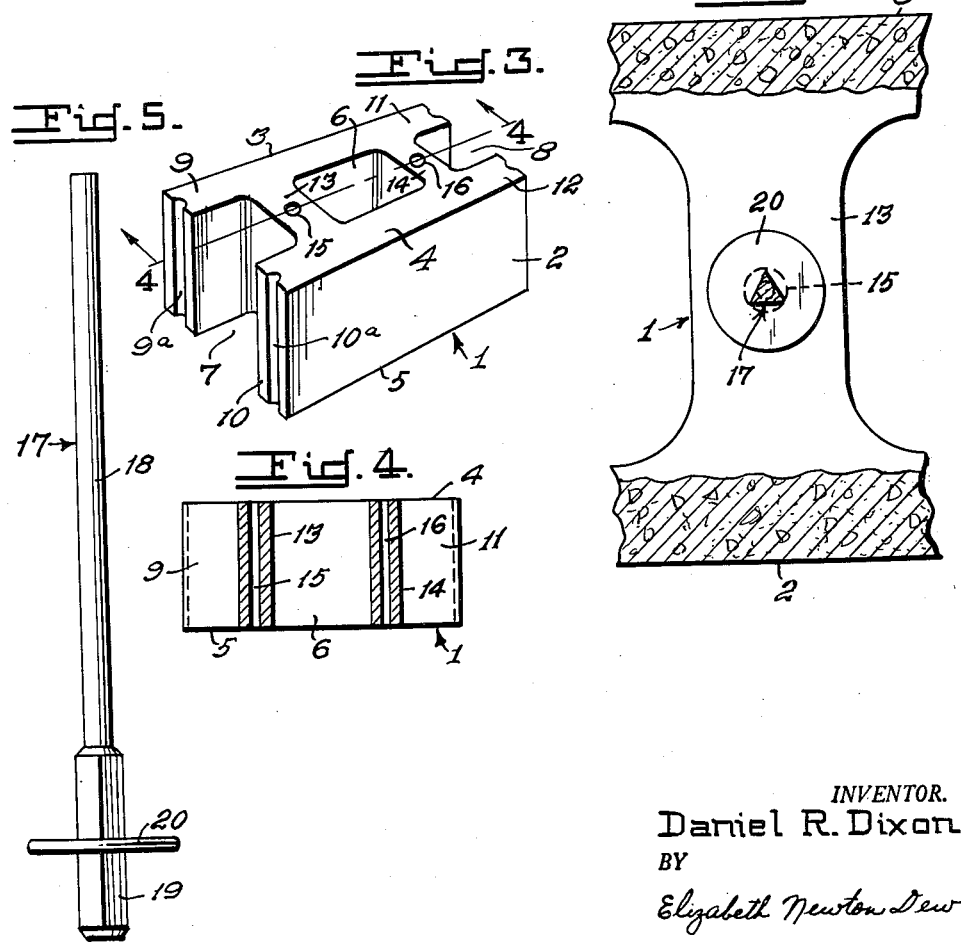
INVENTOR.
Daniel R. Dixon
BY
Elizabeth Newton Dew United States Patent Office 3,036,407
Patented May 29, 1962

3,036,407
BUILDING BLOCK ASSEMBLY
Daniel R. Dixon, 808 Capital Club Bldg., Raleigh, N.C.
Filed Nov. 12, 1957, Ser. No. 695,993
7 Claims. (Cl. 50—443)

In my prior copending application Serial Number 536,239, filed September 23, 1955, for Building Blocks and Method of Assembling Same now abandoned, I have disclosed, inter alia, a building block such as one of cementitious material, and having a dowel or positioning hole accurately located in the upper and lower faces of each of its two transverse webs. All of these holes lie accurately in the vertical plane midway between the two side faces of the block and, as disclosed, extend for a short distance inwardly of the respective upper and lower faces of the block. When a course is being laid, a pair of dowel pins are first placed in the adjacent holes of two contiguous blocks of the underlying course and after application of a slurry of cement or other binder, the block to be laid is positioned so that the dowel holes of its lower face fit over and receive the ends of the pins protruding from the blocks of the underlying course.

These blocks, in conjunction with the dowel pins and the method of assembly disclosed in my said earlier-filed application, provide and result in a wall which is very accurate, strong, and attractive in appearance because the blocks are laid with extreme accuracy in superposed relation and in overlap.

It is the main purpose of the present invention to provide blocks which, in conjunction with dowels, as subsequently described, afford all of the advantages, features and results attained with the blocks forming the subject of my aforesaid prior application and which, in addition, assure accurate positioning of the blocks in a course in a vertical direction so that the bottom surface of all blocks in a course lie in the same horizontal plane and the vertical distance between such horizontal plane of one course and such horizontal plane of an adjacent course is the same. The method of achieving accuracy of positioning in a horizontal direction of the wall and the horizontal direction transversely to the wall, as disclosed in my prior application, has been retained herein in conjunction with the method of achieving accuracy of positioning in a vertical direction which is, in part, the subject of this application.

It is a further object of the present invention to provide a dowel unit which is simple and easy to construct and apply and which assures a finished wall of great strength, accuracy, neatness and attractiveness.

A still further object is to provide a block which, in conjunction with the dowel pins subsequently described, makes it unnecessary to surface or grind either the top or bottom faces of the blocks after curing while at the same time having greater strength, accuracy and attractiveness than prior art walls and, in addition, affords precisely horizontal joints between courses which are all of the same predetermined dimension or thickness.

Yet another object is to provide a dowel pin of novel construction and which is an important feature in the attainment of the objects heretofore stated.

Other objects, features and advantages will become clear to those skilled in the art after a study of the following description in connection with the accompanying drawing.

In the drawing:

FIGURE 1 is a cross-sectional view illustrating a portion of a wall constructed in accordance with the present invention and showing the dowels in their assembled relation with the blocks.

FIGURE 2 is a cross-sectional view taken in a plane identified by the line 2—2, FIGURE 1.

FIGURE 3 is a perspective view to a reduced scale of one of the blocks constructed to embody one of the features of the invention.

FIGURE 4 shows a longitudinal vertical section of the block through its mid-plane as identified by line 4—4, FIGURE 3, and FIGURE 5 is an elevation to an enlarged scale, of one of the dowel pins or rods.

Referring in retail to the drawing, 1 identifies in general a parallelepipedal block of cementitious material, having vertical side wall faces 2 and 3, and top and bottom faces 4 and 5, respectively. As shown, the block has a central passage 6 extending between and opening through top and bottom faces 4 and 5 and generally rectangular in horizontal section. The ends of the block are vertically channeled as at 7 and 8, FIGURE 3, and of the same dimension in the transverse direction as passage 6, to define longitudinally and vertically extending projections such as 9 and 10, duplicated in projections 11 and 12 at the other end of the block. The central passage 6 in conjunction with the end channels 7 and 8 define respective transverse webs 13 and 14. It will be understood that the internal surfaces of the block are given the proper taper from top to bottom to facilitate extraction of the mold. As in the blocks shown in my prior application, the end faces of each of the four projections 9, 10, 11 and 12, are formed with vertical channels 9a, 10a, etc., conveniently semi-circular in cross section.

Each of the webs 13 and 14 is provided with a dowel hole 15 and 16, respectively, positioned vertically in the central vertical plane of the block and extending therethrough between the top and bottom faces 4 and 5. These holes are formed at the time the block is cast, by the provision of appropriate metal rods fixed with the cope of the block machine, not shown. In the preferred form, the dowel holes are tapered. For example, each hole may be of uniform diameter, say ¾" at the top, for a vertical distance of about 1" down from the top surface of the block, while at the bottom it may be of ½" uniform diameter for a distance of 1" upwardly from the bottom surface of the block. The intermediate portion of the hole will then have a uniform taper and merge smoothly into the aforesaid upper and lower cylindrical portions just described. If desired or necessary, these cylindrical end portions of the dowel holes may be perfected by drilling or reaming after or during curing of the block. In a block of the size and type shown, the spacing between the axes of the dowel holes would be 8" and the distance from the axis of each hole to the adjacent face would be $3^{15}/_{16}$" thus leaving a space between the faces of contiguous blocks of ⅛". The dimensions for a standard size block of the type shown may be as given in my prior application. More generally, let "$l$" equal the length of the block, "$s$" the desired spacing between blocks, "$d$" the center-to-center spacing of the blocks and "$y$" the distance from the axis of each dowel hole to the adjacent end of the block. Then the spacing between holes of each block is $d/2$; $d=l+s$ and $$l=\frac{d}{2}+2y$$

By using these equations for any length of block and the desired spacing between blocks, the distance of the dowel holes from the respective ends of the block, as well as all other parameters of the system, can be determined. It is also contemplated that the method may be employed in multiples of the base unit just described.

FIGURE 5 shows in elevation a dowel pin or rod 17 forming an important feature of the present invention and comprising a cylindrical shank portion 18 having an enlarged lower end 19 which is preferably triangular in cross section as clearly shown upon FIGURE 2. An integral flange 20 is located in a plane normal to the axis of the pin at a point about midway of the length of the enlarged end.

In the preferred form wherein the dowel holes 15 and 16 are tapered and terminate in upper and lower cylindrical portions of greater and lesser diameters respectively, as previously described, the enlarged portion 19 of pin 17 above flange 20 will be dimensioned for a smooth fit in the cylindrical portion of the dowel hole of smaller diameter and the enlarged portion below the flange is dimensioned to fit the cylindrical portion of the dowel hole of larger diameter. In each case the dimensions for triangular cross sections are determined by the formula given below. The pins are preferably formed of any suitable plastic but may be of metal. Where a triangular cross section is employed in the enlarged end, it is so dimensioned that it fits smoothly into the holes 15 and 16 with three-line contact so that the pin is positively centered and its axis is coincident with that of the corresponding dowel holes of superposed blocks. Assuming a block of 7¾" height, the pin will have an over-all length of 8" for a one-quarter inch joint between courses. The round shank portion is conveniently ⁵⁄₁₆" in diameter and the length of the enlarged end is about 2". These dimensions may vary in dependence upon the size and type of block. The width of one side of the triangular enlargements will be $$\frac{1}{2}\sqrt{3}D$$

where "D" is the diameter of the dowel holes. A triangular cross section is preferred because it affords positive centering with a minimum of material, friction, and radial pressure within the holes. However it is contemplated that a cross section of square or other geometrical form may be used. The diameter of the flange 20 in the pin shown, is 1½". This dimension may be varied within limits and the flange itself may have a form other than circular, such as square, triangular or elliptical.

In constructing a wall in accordance with the illustrated embodiment of the invention, the first course is laid, using pins 17 which have been cut off ¼" below the upper surface of flange 20, as viewed in FIGURE 5. In laying a block of the initial course, the mason spreads mortar in the usual way and then inserts two of the shortened pins into holes 15 and 16 from the lower face of the block until their flanges contact the lower face thereof. In this position the top ends of the pins are ¾" below the upper face of the block, as shown upon FIGURE 1. The block is then positioned upon the foundation and pressed down until the lower protruding ends of the shortened pins contact the foundation.

The second and succeeding courses are laid using standard pins as shown in FIGURE 5. In laying blocks of these courses, the mason inserts two of the pins into the holes 15 and 16 until their flanges contact the lower face of the block. He then lays mortar in the usual way along the edges of the subjacent course, as shown upon FIGURE 2 and positions the block by inserting the protruding portions of the lower enlarged ends 19 of the pins within contiguous holes of the two blocks of the underlying course and presses it down until these ends contact the upper ends of the pins in the holes of the underlying course, thus effecting a horizontal joint having a precise vertical dimension of ¼", as clearly depicted upon FIGURE 1. When so positioned, the block is accurately located in three mutually normal directions, namely, horizontally in the direction of the course, horizontally in the direction normal to the course, and vertically, with a ¼" joint between courses and a ⅛" joint between confronting faces of the blocks. Moreover, the blocks are located with precise overlap and firmly held in position until the binding mortar has set and the cylindrical cavities conjointly defined by the confronting semi-circular channels 9a, 10a, etc., have been filled with mortar as and in the manner described in my aforesaid prior application. The blocks and half-blocks for ending courses may be as described therein with the exception, of course, that the dowel holes extend completely through these blocks from top to bottom.

I have thus provided a building block which in conjunction with the pins disclosed, afford a wall which is extremely accurate, strong and attractive in appearance, and easy to construct with dimensions according to plans. When completed, the aligned holes of each superposed course are precisely vertical and the pins therein are continuous in end-to-end contact. Furthermore, it is not necessary to grind or surface either the top or the bottom faces of the blocks after casting, since any irregularities are accommodated by the mortar in conjunction with the positive spacing between courses. The flanges 20 of the pins 17 in connection with the contacting ends of the pins of the subjacent course thus accurately determine the vertical spacing between courses. The joints between courses are truly straight and horizontal and the vertical joints are in true alignment.

While I have disclosed the form of the invention and the method of assembly presently preferred by me, in connection with a particular size and type of block, various modifications, substitutions of equivalents and changes of shape, materials or form, in addition to those mentioned in this specification, will readily occur to those skilled in the art after a study of the foregoing description. Consequently, the foregoing should be taken in an illustrative rather than a limiting sense; and it is my desire and intention to reserve all modifications within the scope of the subjoined claims.

In the claims, the term "median plane" means a plane parallel with and midway between the two side faces of the block as laid in a wall. The term "center-to-center spacing" means the horizontal distance in the finished wall, between two vertical lines each lying in the median plane of the blocks and midway between the end faces of the respective ones of two contiguous blocks of a course. The width of a joint between blocks is the distance between end faces of contiguous blocks of a course. Distances with reference to the dowel holes are measured from the central axes of the holes.

Having now fully disclosed the invention, what I claim and desire to secure by Letters Patent is:

1. A wall constructed of blocks of benerally parallelepipedal form each having a pair of spaced parallel dowel holes opening through and normal to its top and bottom faces, said holes being symmetrically related to the respective ends of the block, and a plurality of dowel pins each having a stop flange between its ends and each fitting a respective hole with its flange abutting the lower face thereof, said pins having a length equal to the vertical dimension of the blocks plus the thickness of the joint between courses, each said pin extending below said flange by a distance greater than said thickness of joint.

2. A wall constructed of blocks having faces lying in three mutually normal planes, each block having a pair of parallel dowel holes extending vertically in the median plane of the block and opening through the top and bottom faces thereof, said holes being spaced apart a distance equal to one-half the center-to-center spacing of the blocks, each said hole being spaced from the adjacent end face of the block by a distance $$\frac{l-s}{4}$$

where "l" is the length of the block and "s" the predetermined distance between end faces of contiguous blocks of a course, and a plurality of dowel pins each fitting a respective hole and each having an integral stop flange intermediate its ends and in contact with the lower face of its block, the upper end of each pin being below the upper face of its block and the downwardly protruding end of each pin contacting the upper end of the pin in a block of the subjacent course.

3. The combination of a generally parallelepipedal building block having a pair of spaced parallel dowel holes in the median plane thereof and extending through and normal to the top and bottom faces of the block, said holes being spaced equal distances from the respective end faces thereof, and a dowel pin comprising a shank sized to fit said holes and having an abutment flange between the ends of said shank and integral therewith to abut one face of said block when said shank is inserted into a dowel hole, said pin having a length equal to the distance between said faces plus the predetermined thickness of a mortar joint over one said face when said block is assembled into a wall, the distance of said flange from one end of said shank being greater than said predetermined thickness but less than one-half the over-all length of the pin.

4. The combination of a generally parallelepipedal building block having a dowel hole opening through its top and bottom faces normal thereto, and a dowel pin insertable into said hole and having a length equal to the distance between said faces plus the predetermined thickness of a mortar joint over said one said face when said block is assembled into a wall, said pin having an integral enlargement at one end sized to have a smooth fit in said hole, said enlargement having an integral abutment flange substantially midway between its ends said flange being spaced from the near end of the pin a distance greater than said predetermined thickness of joint between courses.

5. A wall constructed of a plurality of superposed courses of blocks of uniform, generally parallelepipedal form, each block having top, bottom and end faces and a pair of parallel dowel holes in the median plane of the block, each hole extending through the parallel top and bottom faces of the block normal thereto, said holes being spaced apart a distance equal to one-half the center-to-center spacing of the blocks, each said hole being spaced from the adjacent end of the block a distance $$\frac{l-s}{4}$$

where "$l$" is the length of the block and "$s$" is the predetermined spacing between end faces of contiguous blocks of a course, and a plurality of dowel pins in said holes, each having an over-all length equal to the vertical dimension of the blocks plus the predetermined thickness of the joint between courses, each said pin including a shank portion, an integral axial enlargement at one end sized to have a smooth fit within said holes, and a stop flange integral with said enlargement between the ends thereof, said stop flange having a thickness less than said predetermined thickness of the joint between courses, each said stop flange abutting the lower face of the block containing the shank portion of said dowel pin with the lower end of said enlargement extending downwardly into the corresponding hole of the block of a subjacent course and contacting the end of a dowel pin therebelow to positively gage and determine the spacing of the block above those of the subjacent course and its overlap over two contiguous blocks of the subjacent course.

6. In a system of building blocks, a generally parallelepipedal block having a pair of parallel dowel holes in the median plane of the block, each opening through the top and bottom faces of the block normal thereto, and a pair of dowel pins each having a shank portion adapted to fit a respective hole and an integral flange between its ends, said flange limiting insertion of a pin within a hole so that its inserted end is below the opposite face of the block, said pin having a length equal to the vertical dimension of the block plus the predetermined thickness of joint between confronting faces of blocks of contiguous courses, aligned pins abutting in end-to-end contact.

7. A dowel pin for a building block having dowel holes therein for positioning the same in emplacement in a wall, said dowel pin comprising, an elongated shank, one end only of said shank being of increased size and defining an enlargement of uniform cross section, said enlargement extending from one end of the pin for a distance less than one-half the over-all length of the pin, and a flange integral with said enlargement and substantially midway between the ends of said enlargement.

References Cited in the file of this patent

UNITED STATES PATENTS

| | | |
|---|---|---|
| 583,926 | McRoy | June 8, 1897 |
| 660,308 | Pixley | Oct. 23, 1900 |
| 825,069 | Peirce | July 3, 1906 |
| 1,071,239 | Kirk | Aug. 26, 1913 |
| 1,107,428 | Likes | Aug. 18, 1914 |
| 1,657,861 | Lucas | Jan. 31, 1928 |
| 2,029,876 | Klein | Feb. 4, 1936 |
| 2,141,397 | Locke | Dec. 27, 1938 |
| 2,627,176 | Levy | Feb. 3, 1953 |
| 2,684,588 | Robertson | July 27, 1954 |
| 2,769,333 | Reintjes | Nov. 6, 1956 |

FOREIGN PATENTS

| | | |
|---|---|---|
| 923,860 | France | Feb. 24, 1947 |